Sept. 8, 1959            I. S. BLONDER            2,903,064
CABLE INSULATION CUTTER WITH CUTTER MOVABLE
ABOUT THE PERIPHERY OF THE CABLE
Filed April 18, 1956                               3 Sheets-Sheet 1
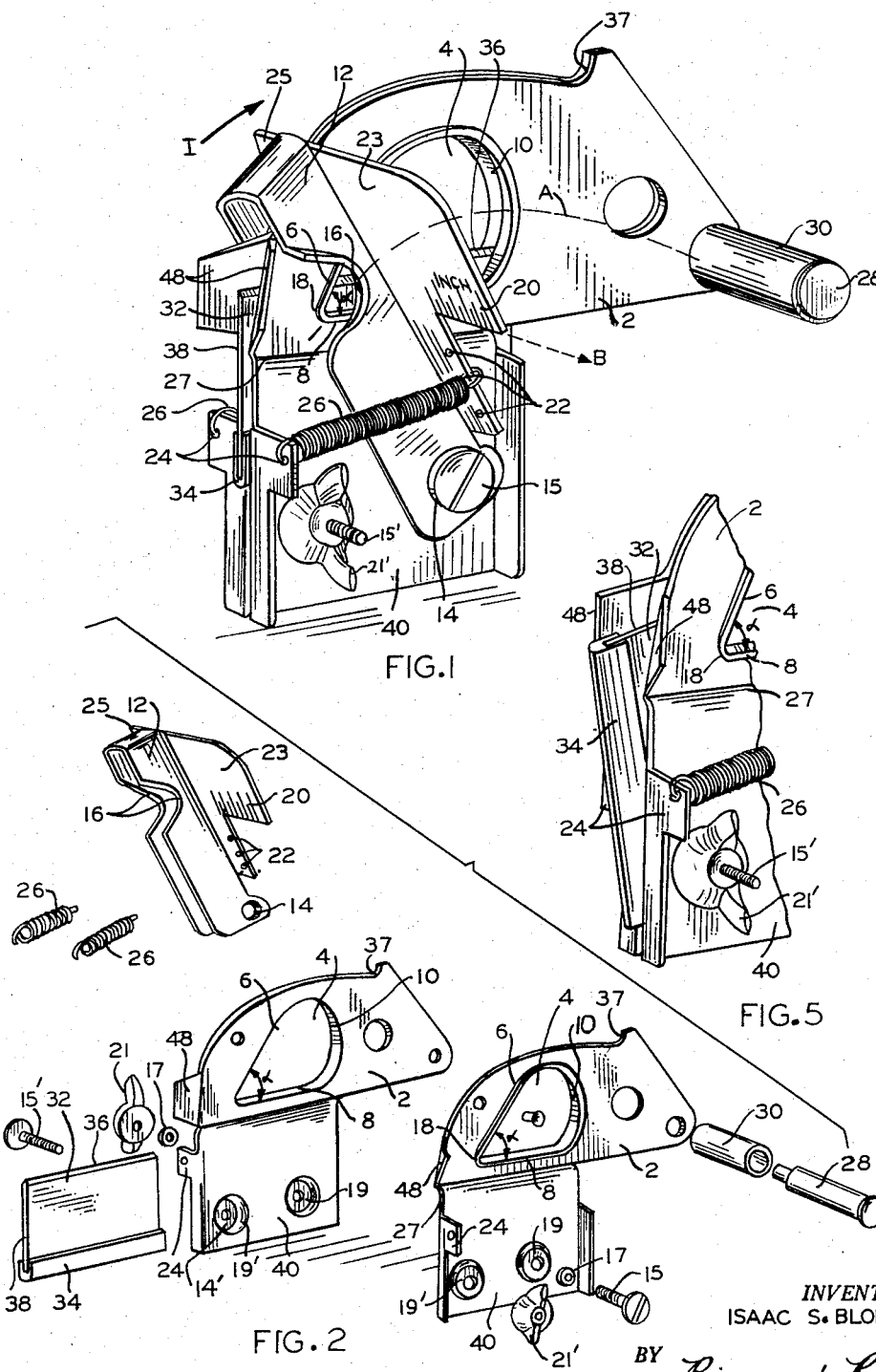
INVENTOR.
ISAAC S. BLONDER
BY Rines and Rines
ATTORNEYS Sept. 8, 1959
I. S. BLONDER
2,903,064
CABLE INSULATION CUTTER WITH CUTTER MOVABLE
ABOUT THE PERIPHERY OF THE CABLE
Filed April 18, 1956
3 Sheets-Sheet 2
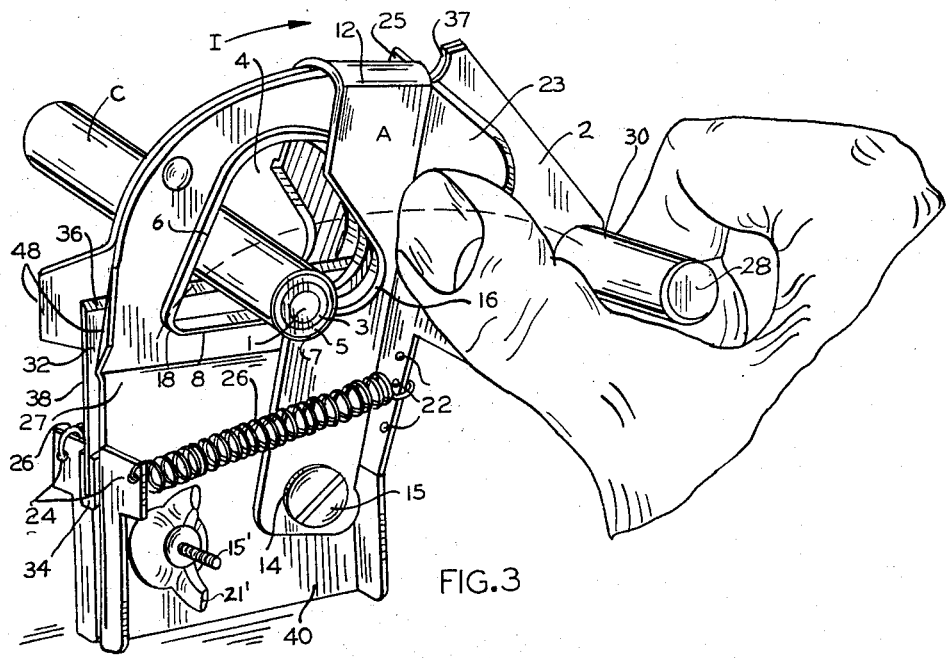
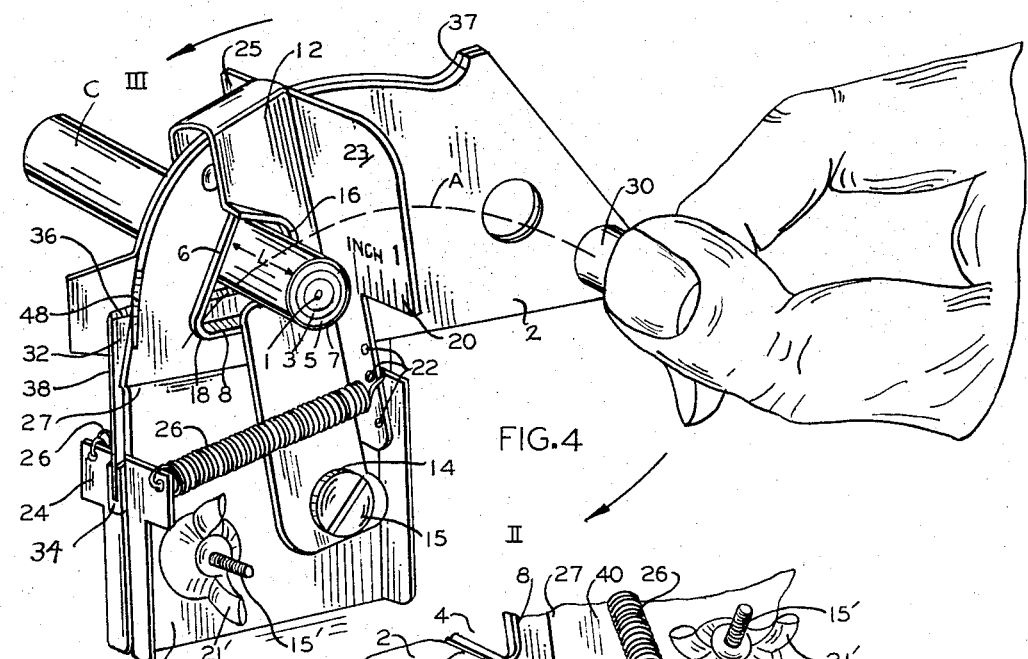
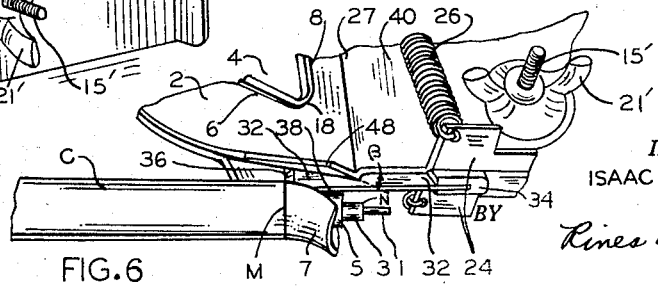
INVENTOR.
ISAAC S BLONDER
BY Rines and Rines
ATTORNEYS Sept. 8, 1959     I. S. BLONDER     2,903,064
CABLE INSULATION CUTTER WITH CUTTER MOVABLE
ABOUT THE PERIPHERY OF THE CABLE Filed April 18, 1956     3 Sheets-Sheet 3

INVENTOR.
ISAAC S. BLONDER

BY Rines and Rines

ATTORNEYS

United States Patent Office 2,903,064
Patented Sept. 8, 1959

2,903,064

CABLE INSULATION CUTTER WITH CUTTER MOVABLE ABOUT THE PERIPHERY OF THE CABLE

Isaac S. Blonder, Westfield, N.J.

Application April 18, 1956, Serial No. 579,101

14 Claims. (Cl. 164—60)

The present invention relates to rotary cutters and cutting methods and, more particularly, to cutters adapted for stripping cable, such as, for example, coaxial transmission lines and the like.

Various types of cutting instruments have been evolved for stripping insulated shielded wire and cable and for cutting non-metallic tubing and similar items. Apart from fixed machinery, however, there has not heretofore been available a satisfactory hand-operated device that a user may employ to cut or strip an insulated or shielded wire or cable without injuring or fraying the underlayers or the shielding. Ordinary hand cutters now in use have a tendency, moreover, to pull, fray or unbraid the woven-wire shielding that is conventionally used in, for example, coaxial transmission lines, and they frequently damage the wire conductors and insulation layers during the stripping process.

An object of the present invention, accordingly, is to provide a new and improved rotary cutter that shall not be subject to the above-described disadvantages, but that, to the contrary, shall enable the user to operate the cutter upon an insulated or shielded wire or cable or upon non-metallic tubing and the like, to cut and strip outer insulation or other layers without injuring underlayers or conductors embedded therein. In summary, this result is attained through the use of a substantially planar support provided with an aperture for receiving a cable and the like and having a pair of diverging bounding walls defining an angle therebetween. A trigger arm is pivotable in a plane adjacent and substantially parallel to the support and is provided with a clamping region that, during pivotal movement of the arm in one direction, describes an arc extending from the vertex of the said angle toward a bounding wall of the aperture opposite the vertex. Resilient means is provided connected between the arm and the support for resiliently opposing the said pivotal movement of the arm in the said one direction. A cutting blade projects into the aperture so that rotation of the cutter about a cable and the like clamped within the aperture effects rapid and clean cutting operations. Preferred constructional details are hereinafter fully presented.

Another object is to provide such a cable stripper that can cut braided or woven-wire shielding without pulling, fraying or unbraiding the same.

A further object is to provide a cutter that is particularly adapted to strip the inner insulation of, for example, audio-frequency or radio-frequency transmission lines without damaging the conductors imbedded therein.

Still an additional object is to provide such a cutter that automatically enables the measurement of the length of the conductor lead that it is desired to expose in the stripping process.

A further object is to provide a new and improved method of stripping coaxial cables.

Other and further objects will be explained hereinafter and will be more particularly pointed out in the appended claims.

The invention will now be described in connection with the accompanying drawings, Fig. 1 of which is a perspective view of a cutter constructed in accordance with a preferred embodiment of the invention;

Fig. 2 is an exploded view, upon a somewhat reduced scale, illustrating the parts of the cutter before assembly;

Figs. 3 and 4 are views similar to Fig. 1 illustrating successive positions of use of the cutter;

Fig. 5 is a fragmentary perspective illustrating the carrying position of the cutter blade;

Fig. 6 is a fragmentary perspective of an edge-slitting operation; and

Figure 7:
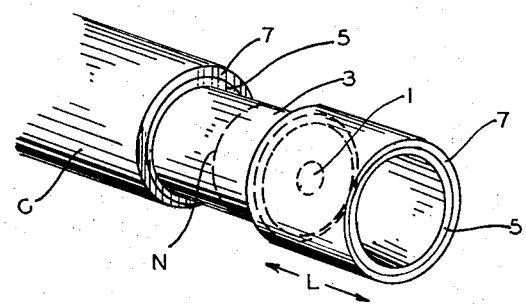
Figs. 7 to 9 are views of successive stages in the stripping operation of a terminal portion of a coaxial cable.

The cutter of the present invention embodies a substantially planar support, preferably comprising a pair of juxtaposed substantially L-shaped sheet-metal members 2, shown assembled in Fig. 1 and disassembled in Fig. 2. The support 2 is provided near the vertex region of the L with an aperture 4 of substantially triangular shape, having bounding walls 6, 8 and 10. The walls 6 and 8 diverge from a vertex 18, preferably forming therebetween an acute angle α. The walls 6, 8, and 10 are extended out of the plane of the support 2 to provide substantial clamping-surface areas for the cable or other member that is to be inserted within the aperture 4, as later discussed. While, as before indicated, the cutter of the invention is adapted to operate upon many different kinds of cables, tubes and the like, for purposes of illustration it will hereinafter be described as applied to coaxial transmission lines.

A trigger arm 12, preferably of substantially U-shape, is provided with lower apertures 14 that align with corresponding projecting apertures 19 near the bottom of the lower outwardly bowed portions 40 of the support 2. The trigger arm 12 is pivoted about the apertures 19 over the upper edge of the support 2. This pivoting is effected by means of a threaded screw 15 passed through the apertures 14 in the trigger arm 12 and the apertures 19 in the L-shaped member 2, secured by a wing nut 21. Washers 17 may be provided between the screw 15 and the nut 21 and the bearing apertures 14. The U-shaped trigger arm 12 is thus pivotable about the apertures 14 in planes adjacent opposite sides of the support 2 and substantially parallel to the support 2. Each of the left-hand edges of the U-shaped trigger arm 12 is intermediately provided with a recessed clamping region 16 that, during pivotal movement of the trigger arm 12, in the direction of the arrow I, will describe an arc A extending from the vertex 18 to the opposite wall 10 of the aperture 4. The radius of the arc A, of course, is substantially the distance from the pivot point 14 to substantially the center of the clamping region 16. For reasons that will hereinafter be explained, the arc A preferably substantially bisects the angle α formed by the walls 6 and 8 over an appreciable portion of the aperture 4 and the trigger-arm-clamping region 16 preferably extends substantially normal to the bisecting arc A. Both the clamping region 16 and the wall 10 may actually be curved, as shown, to provide greater area-clamping of a cylindrical cable.

The trigger arm 12 is also provided with a flange 23 adjacent the clamping region 16 and extending in a plane away from and substantially normal to the plane of the support 2, along the direction B, providing a thumb-operating area, as more particularly shown in Fig. 3. The trigger-arm flange 23 is preferably calibrated in units of length, as illustrated at 20, along the direction B so that, when a coaxial cable C or the like is inserted within the aperture 4, to extend along the direction B, as illustrated in Figs. 3 and 4, the desired length to be stripped may be accurately ascertained in advance of operation of the rotary cutter. Extending below the calibrated flange 23 is an extension provided with a plurality of recesses or apertures 22 for receiving one end of a resilient spring 26. The other end of the spring 26 is secured to the support 2 at a flange 24 provided at the left-hand edge of the support 2. A similar spring 26 is similarly connected between an outward extension 25 at the other or left-hand arm of the U-shaped trigger arm 12 and a flange 24 provided on the other side of the support 2. The springs 26 therefore oppose the pivotal movement of the trigger arm 12 along the arc A in the direction of the arrow I. Depending upon which of the three apertures 22 is used to secure the right-hand end of each spring 26, different degrees of opposing or biasing action upon the trigger arm 12 will be exerted. Adjustment for cables of widely different diameters and insulation hardness and the like may thus be effected.

A handle 28 extends from a point at the free end of the horizontal arm of the L of the support 2 outward in a direction substantially parallel to the direction B. The handle 28 is preferably provided with a freely rotatable outer cylindrical sleeve 30 which assists the user in relatively rotating the cable stripper and the section C of coaxial line and the like inserted within the aperture 4, as illustrated in Figs. 3 and 4. Further to aid such operation, the handle 28 preferably lies substantially along the arc A.

A cutting blade such as, for example, a razor blade 32 having a thicker rearward portion 34, a longitudinally extending cutting edge 36 and a transverse cutting edge 38, is clamped between the outwardly bowed surfaces 40 of the pair of members comprising the support 2. The before-mentioned screw 15 and wing nut 21, together with a further wing nut 21' for a further screw 15' that is passed through projecting apertures 19', corresponding to but displaced to the left of the apertures 19, clamp the surfaces 40 against the blade 32 with the longitudinal edge 36 projecting into the aperture 4 above the wall 8 thereof. The outer transverse edge 38 of the blade 32 also projects outward, but to the left, beyond the flanges 24, for a later-described purpose. The outwardly bowed nature of the clamping surfaces 40 of the support 2 effects the initial clamping of the thin portion 32 of the blade at the bowed region 27 before the thicker back edge 34 is clamped, thus providing a collapsing action that insures the rigid holding of the blade in the operative cutting position of Figs. 1, 3 and 4.

The angle α defined by the aperture walls 6 and 8 is preferably of the order of 60 degrees so as to obtain the uniform clamping action of substantially isosceles-triangle clamps formed by the walls 6 and 8 and the clamping wall 16 of the trigger arm 12 as the trigger arm 12 is moved along the arc A to accommodate the insertion within the aperture 4 of cables of different diameters. The extreme forward and rearward positions of the trigger arm 12, as the arm is respectively operated in opposition to and in response to the action of the springs 26, are limited by the forward stop 37 and the rearward stops 48. The latter are preferably in the form of diverging wings which serve, also, to protect the user from the sharp exposed corner of the longitudinal and transverse edges 36 and 38 of the blade 32.

Once the cable C is inserted in the aperture 4, Fig. 3, the springs 26 resiliently hold the same clamped between the walls 6 and 16, Fig. 4, in engagement with the longitudinal cutting edge 36 of the blade 32 projecting from the wall 8. The clamping region 16 will exert a strong clamping force, under the action of the springs 26, directed toward the vertex 18 along substantially the arc A. The cutter may then be rotated relative to the cable C by grasping the handle 28, 30 and rotating it clockwise in the direction of the arrow II, Fig. 4. Considerable resilient pressure is exerted upon the blade edge 36 during such rotation, so that it cuts into the cable cleanly and rapidly. The before-described location of the handle 28, 30 substantially on the arc A gives rise to dynamic balance during the cutting operation.

For safe storing and handling of the rotary stripper, it is desirable to loosen the wing nuts 21 and 21' and to orient the blade 32 so that the transverse and longitudinal edges thereof are hidden within the region between the lower surfaces 40 of the support members 2, as illustrated in Fig. 5. This enables the instrument to be carried with safety.

Figure 8:
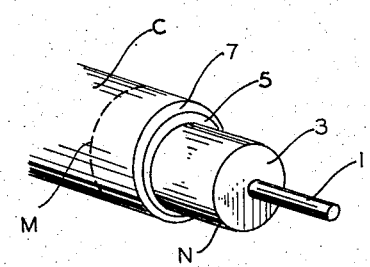

As before mentioned, the cutter or stripper of the present invention is particularly adapted for preparing terminal sections of coaxial-cable transmission lines C comprising an inner conductor 1 imbedded in an inner insulation sheath 3, which, in turn, is covered by a braided or woven-wire outer-conductor shield 5, externally covered by an outer insulation jacket 7. Several rotations of the cutter 2, after application to the cable C and measurement of the appropriate length L along the scale 20, as shown in Fig. 4, will result in cleanly cutting through the outer insulation 7 and the braided or woven shield 5 without pulling, fraying or unbraiding the same. The cut is effected in a plane normal to the length of the cable. The outward extension of the wall 8 out of the plane of the support 2 meters the depth of cutting by the blade 32. The cut section L of outer insulation 7 and outer conductor 5 may then be moved toward the free end of the cable C, as shown in Fig. 7, to expose a section of the inner insulation 3. The cutter may then be applied to clamp the exposed section 3 intermediately at N and may be rotated in the same manner as illustrated in Fig. 4 to cut through the exposed inner-insulation section 3 to the inner conductor 1. One can sense when the inner conductor 1 has been reached by the change in rapidity and ease of cutting. The transversely cut sections L and to the right of N are then removed to expose a terminal section 1 of the inner conductor, Fig. 8, and an adjacent section of the inner insulation 3. The cutter is then reapplied to a point M on the outer insulation 7 and is rotated counter-clockwise, in the direction of the arrow III of Fig. 4, so that there is less clamping action involved and, in fact, the tendency is to pull the blade away from the cable. By this counter-clockwise rotation, therefore, a slower cut is achieved and only the outer insulation 7 will be cut without damage to the braided or woven shield outer conductor 5. The cut section of outer insulation 7 to the right of M may then be longitudinally slit to remove the outer-insulation section to the right of M and expose a terminal portion of outer conductor 5, Fig. 9. This slitting is effected by drawing the cable over the corner portion of the transverse edge 38 of the blade, as shown in Fig. 6, within the guiding channel formed by the protective wing-stops 48. In order better to expose the corner of the edges 36 and 38 of the blade 32 and to prevent interference with the projecting thick edge 34 of the blade during this longitudinal slitting, the wings 48 are preferably disposed inclined at a slight acute angle β, Fig. 6, with respect to the edges of the lower portion 40 of the support 2 and with respect to the edge 38 of the blade 32.

Figure 9:
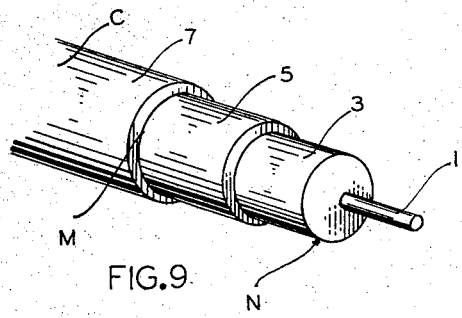

The resulting successive-step exposed terminal sections 1, 3 and 5 of Fig. 9 is preferred for ready application to coaxial connectors and the like. Clearly, other stripping configurations may also, if desired, be achieved with the cutter of the present invention.

Modifications will occur to those skilled in the art, and all such are considered to fall within the spirit and scope of the invention as defined in the appended claims.

What is claimed is:

1. A rotary cutter comprising a substantially planar support provided with an aperture having a pair of diverging bounding walls defining an angle therebetween, a pivot point disposed upon the support a predetermined distance from the vertex of the said angle, a trigger arm pivotable in a plane adjacent and substantially parallel to the support about the said pivot point provided with a clamping region that, during pivotal movement of the arm in one direction, describes an arc extending from the said vertex toward a bounding wall of the aperture opposite the said vertex, the arm being of U-shape at its free end to receive an edge of the support over which it is guided during the said pivotal movement, resilient means connected between the arm and the support for resiliently opposing the said pivotal movement of the arm in the said one direction, a cutting blade having a longitudinal edge projecting into the aperture along one of the said diverging bounding walls thereof and a transverse edge projecting from a side of the support near the said vertex, and a stop for engaging the free end of the arm at the said transverse edge of the blade and comprising a pair of diverging protector wings.

2. A rotary cutter as claimed in claim 1 and in which the protector wings form an acute angle with respect to said transverse edge of the blade.

3. A rotary cutter as claimed in claim 1 and in which the support is of substantially L-shape with the said pivot point disposed near the end of one arm of the L, the said aperture disposed in the region of the vertex of the L, and the said protector wings disposed on the said one arm of the L near the vertex region of the L.

4. A rotary cutter comprising a substantially planar L-shaped support provided near the vertex region of the L with a substantially triangular aperture, a pivot point disposed upon the support near the end of one of the arms of the L displaced from the vertex of one of the angles of the aperture, a trigger arm pivotable in a plane adjacent and substantially parallel to the support about the said pivot point provided with a clamping region that, during pivotal movement of the arm in one direction, describes an arc extending from the said vertex of the said one angle of the aperture toward the wall of the aperture opposite thereto, the trigger arm having a flange adjacent the said clamping region extending in a plane away from and substantially normal to the planar support, resilient means connected between the arm and the support for resiliently opposing the said pivotal movement of the arm in the said one direction, a handle extending from a point near the free end of the other arm of the L in a direction substantially normal to the planar support, means for securing a cutting blade in an operative position with a longitudinal edge projecting into the aperture and a transverse edge projecting from a side of an arm of the L-shaped planar support, and a stop for engaging the free end of the trigger arm at the said transverse edge of the blade and comprising a protector for the transverse edge.

5. A rotary cutter comprising a substantially planar L-shaped support provided near the vertex region of the L with a substantially triangular aperture, a pivot point disposed upon the support near the end of one of the arms of the L displaced from the vertex of one of the angles of the aperture a predetermined distance, a trigger arm pivotable in a plane adjacent and substantially parallel to one surface of the support about the said pivot point provided with a clamping region that, during pivotal movement of the arm in one direction, describes an arc of radius substantially equal to the said predetermined distance extending from the said vertex of the said one angle of the aperture toward the wall of the aperture opposite thereto, the arc substantially bisecting the said angle over an appreciable portion of the aperture and the arm-clamping region extending in a direction substantially normal to the bisector of the said angle, the trigger arm having a flange adjacent the said clamping region extending in a plane away from and substantially normal to the planar support, resilient means connected between any of a plurality of points along the arm and the support for resiliently opposing the said pivotal movement of the arm in the said one direction with different biasing forces, a handle extending from a point lying substantially on the said arc and near the free end of the other arm of the L in a direction substantially normal to the planar support, means comprising a clamp extension of the planar support for securing a cutting blade in an operative position with a longitudinal edge projecting into the aperture along one of the walls adjacent the said one angle of the aperture and a transverse edge projecting from a side of the said one arm of the L-shaped planar support near the said vertex region of the L, and a stop for engaging the terminal portion of the trigger arm at the said transverse edge of the blade and comprising a pair of diverging protector wings.

6. A rotary cutter as claimed in claim 5 and in which the trigger arm flange is calibrated in units of length along a direction substantially normal to the planar support.

7. A rotary cutter as claimed in claim 5 and in which the cutting blade is provided with a thin forward portion and a thick rear edge and the said clamp extension is provided with a collapsing action for gripping the thin forward portion prior to gripping the thick rear edge.

8. A rotary cutter comprising a substantially planar support comprising a pair of similar juxtaposed and aligned members each provided with an aperture having a pair of diverging bounding walls defining an angle therebetween, a pivot point disposed upon the support a predetermined distance from the vertex of the said angle, a U-shaped trigger arm pivotable at the free ends of the U about the said pivot point with the neck of the U passing over an edge of the support, the trigger arm being provided with an intermediate clamping region that, during pivotal movement of the arm in one direction, describes an arc extending from the said vertex toward a bounding wall of the aperture opposite the said vertex, resilient means connected between the arm and the support for resiliently opposing the said pivotal movement of the arm in the said one direction, and a cutting blade projecting into the aperture.

9. A rotary cutter as claimed in claim 8 and in which the said arm is provided with a flange adjacent the said clamping region extending in a plane away from and substantially normal to the substantially planar support.

10. A rotary cutter as claimed in claim 9 and in which the flange is calibrated in units of length with the calibrations extending along a line substantially normal to the planar support.

11. A rotary cutter as claimed in claim 8 and in which the said angle is substantially sixty degrees and the said arm-clamping region forms angles of substantially sixty degrees with the walls adjacent the said angle.

12. A rotary cutter as claimed in claim 8 and in which means is provided for securing the blade in an inoperative position so that it does not project into the aperture, thereby to adapt the cutter for safe handling.

13. A rotary cutter as claimed in claim 8 and in which an edge of the cutting blade projects also from a side of the said support near the said vertex.

14. A rotary cutter as claimed in claim 13 and in which means is provided for securing the blade in an inoperative position so that it does not project into the aperture or beyond the sides of the support, thereby to adapt the cutter for safe handling.

References Cited in the file of this patent

UNITED STATES PATENTS

| | | |
|---|---|---|
| 529,488 | Gile | Nov. 20, 1894 |
| 1,165,176 | Hornor | Dec. 21, 1915 |
| 1,275,225 | Cleve | Aug. 13, 1918 |
| 1,756,171 | Bommer | Apr. 29, 1930 |
| 2,235,575 | Edwards | Mar. 18, 1941 |
| 2,279,046 | Kearney | Apr. 7, 1942 |
| 2,370,733 | Jones | Mar. 6, 1945 |
| 2,539,372 | Metzler | Jan. 23, 1951 |
| 2,615,516 | Kearney | Oct. 28, 1952 |
| 2,676,399 | Clearwater | Apr. 27, 1954 |
| 2,678,491 | Thomas | May 18, 1954 |
| 2,725,774 | Tekse | Dec. 6, 1955 |